United States Patent
Prasad et al.

(10) Patent No.: US 7,923,636 B2
(45) Date of Patent: Apr. 12, 2011

(54) STRAIN RELIEF DEVICE FOR AN ELECTRICAL CONDUCTOR

(75) Inventors: Abhilash J. Prasad, Sloan, NY (US); Jessica M. Galuski, Buffalo, NY (US); Christopher P. Camacho, Derby, NY (US); Edward A. Wilkolaski, Lancaster, NY (US)

(73) Assignee: Curbell Electronics, Inc., Orchard Park, NY (US)

( * ) Notice: Subject to any disclaimer, the term of this patent is extended or adjusted under 35 U.S.C. 154(b) by 55 days.

(21) Appl. No.: 12/362,507

(22) Filed: Jan. 30, 2009

(65) Prior Publication Data

US 2010/0193220 A1 Aug. 5, 2010

(51) Int. Cl.
*H02G 15/02* (2006.01)
(52) U.S. Cl. .................................. 174/74 R; 174/135
(58) Field of Classification Search ................ 174/74 R, 174/135
See application file for complete search history.

(56) References Cited

U.S. PATENT DOCUMENTS

| | | | | |
|---|---|---|---|---|
| 4,150,250 A | * | 4/1979 | Lundeberg | 174/655 |
| 5,329,603 A | * | 7/1994 | Watanabe et al. | 385/86 |
| 5,739,472 A | * | 4/1998 | Buck et al. | 174/107 |
| 6,353,179 B1 | * | 3/2002 | Davidson | 174/505 |
| 6,621,005 B1 | * | 9/2003 | Lovec et al. | 174/74 R |
| 2005/0269124 A1 | * | 12/2005 | Suzuki et al. | 174/93 |

* cited by examiner

*Primary Examiner* — Chau N Nguyen
(74) *Attorney, Agent, or Firm* — Hodgson Russ LLP

(57) ABSTRACT

A strain relief device for connecting a cable to a housing of an electronic device comprises an elongated elastic sleeve including first and second opposite ends and an axially extending sleeve passage, and a rigid insert including a first portion surrounded by the sleeve, a second portion protruding from the second end of the sleeve, and an axially extending insert passage aligned with the sleeve passage. The second portion of the insert is shaped to be non-rotatably received by a wall opening of the housing through which the cable passes, and may be D-shaped to mate with a D-shaped wall opening of the housing to prevent relative rotation. The second portion may carry a removable retainer, such as a C-shaped clip, for engaging a wall of the housing to prevent withdrawal of the insert. The invention facilitates serviceability and eliminates overmolding of a strain relief device onto the cable.

18 Claims, 2 Drawing Sheets

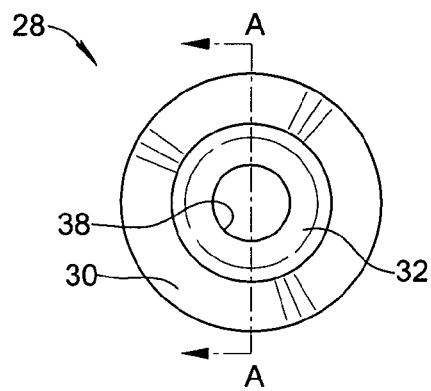 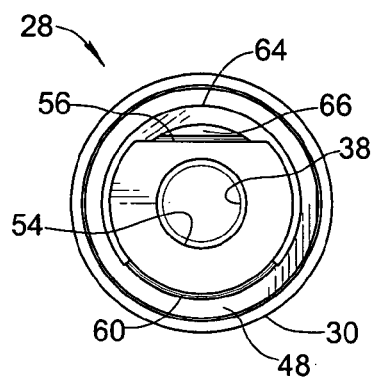
Fig. 3  Fig. 4
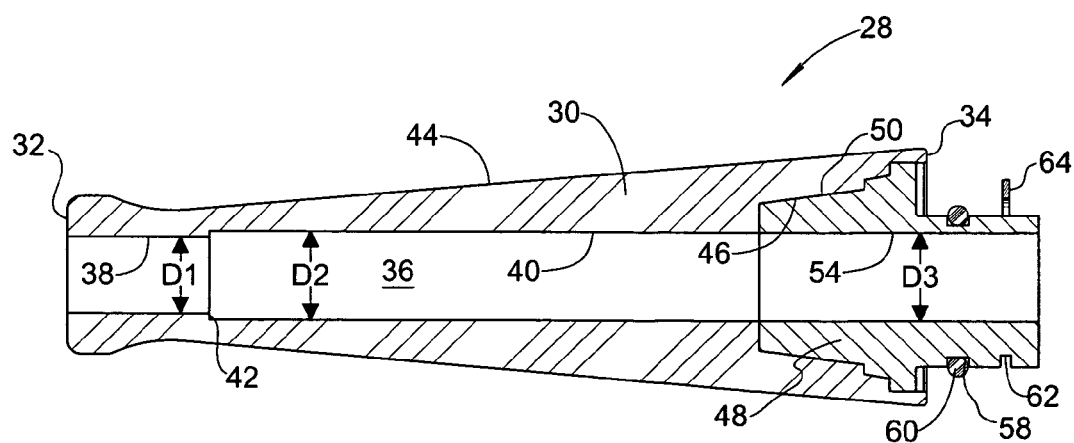
Fig. 5

STRAIN RELIEF DEVICE FOR AN ELECTRICAL CONDUCTOR

FIELD OF THE INVENTION

The present invention is relates to strain relief devices for connecting a cable to a housing of an electronic device.

BACKGROUND OF THE INVENTION

Hand-held electronic devices often have a flexible cable connecting the hand-held device to another, more stationary electrical device. The flexible cable that electrically and physically connects the two devices may house conductors used to carry electric power and/or communication signals. For example, a pillow speaker is commonly connected to a nurse call station and/or television via a flexible cable so that a person can operate the television, communicate with the nurse or operate other hospital room devices while confined to a hospital bed.

During normal use, the hand-held device may be pulled by the user in such a manner that force is applied to the cable sheath and/or the conductors inside the cable sheath. This application of force can weaken the cable and/or the conductors inside the cable and cause premature failure. To help prevent this failure mode, a strain relief device is commonly used.

The hand-held device is commonly of a rigid nature and the strain relief device is of a semi-rigid nature. The semi-rigid strain relief device provides a transition path from the rigid hand-held device to the flexible cable itself. When force is applied to the cable, the strain relief device may be caused to flex, thereby transferring some of the force to the rigid hand-held device. In this manner, the force on the cable is transferred over the length of the strain relief device rather than through a single point as it would be with no strain relief device. In addition, by providing this resistive force, the strain relief may also make the user aware of the fact that he or she may be on the verge of applying too much force, thereby giving the user an opportunity to take corrective action to prevent failure.

Prior art strain relief devices are typically made from a material that is more rigid than the cable and less rigid than the device housing. A conventional manufacturing process includes permanently "overmolding" the strain relief device onto the cable. In many instances, the strain relief device is thicker near the device housing and less thick where the cable exits the strain relief device distally from the device housing. This allows the strain relief to be less flexible near the device housing and more flexible away from the housing.

SUMMARY OF THE INVENTION

A strain relief device for connecting a cable to a housing of an electronic device comprises an elongated sleeve including first and second opposite ends and a sleeve passage extending in an axial direction through the sleeve, and an insert including a first portion surrounded by the sleeve, a second portion protruding from the second end of the sleeve, and an axially extending insert passage through the insert that is aligned with the sleeve passage. The sleeve may be formed of an elastic material, for example an elastomeric material. The insert is more rigid than the sleeve, and may be formed of injection-molded plastic resin. The second portion of the insert is shaped to be non-rotatably received by a wall opening of the housing through which the cable can pass to reach an interior of the housing, and may be D-shaped to mate with a D-shaped wall opening of the housing to prevent relative rotation. The second portion may carry a removable retainer, such as a C-shaped clip, for engaging a wall of the housing to prevent withdrawal of the insert. The second portion of the insert may also carry a resilient ring arranged circumferentially about the second portion to form a seal and eliminate play between the housing and the insert.

The invention also extends to an assembly incorporating a strain relief device as summarized above in combination with a cable and an electronic device coupled to the cable.

The invention further extends to a method for connecting a cable to a housing of an electronic device using a strain relief device as summarized above, wherein the cable is pulled through the axially extending passage of the strain relief device, and at least a segment of the axially extending passage squeezes the cable. In this way, overmolding of the strain relief device onto the cable may be avoided.

BRIEF DESCRIPTION OF THE DRAWINGS

In the drawings:

FIG. 3 is a first end view of the strain relief device;

FIG. 4 is a second end view of the strain relief device; and

FIG. 5 is a cross-sectional view of the strain relief device taken generally along the line A-A in FIG. 3.

DETAILED DESCRIPTION OF THE INVENTION

Figure 1:
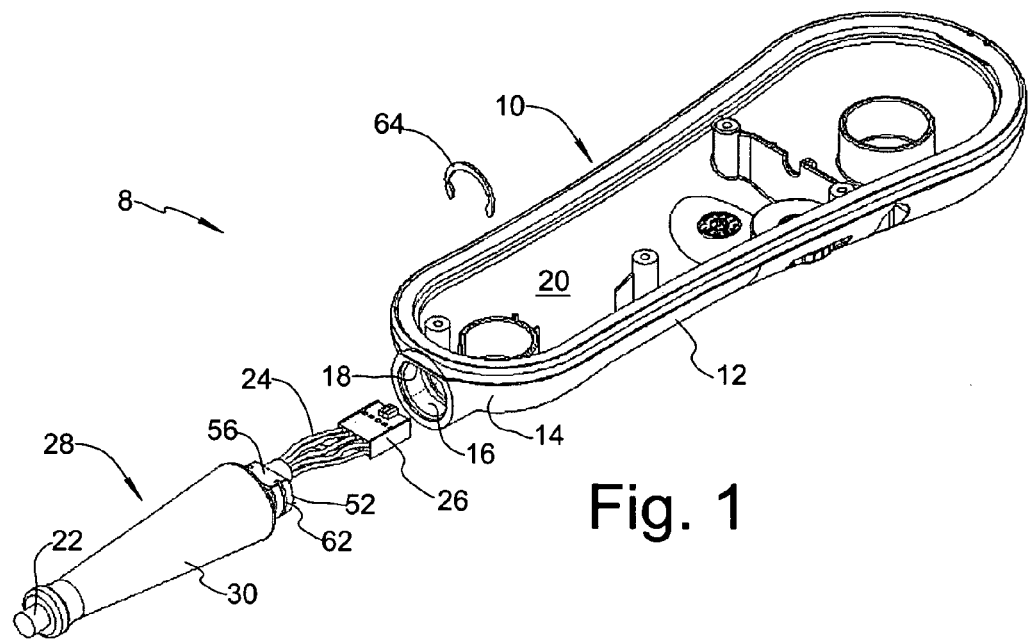
FIG. 1 is an exploded view of an assembly including an electrical cable connected to an electronic device by a strain relief device in accordance with an embodiment of the present invention.
Figure 2:
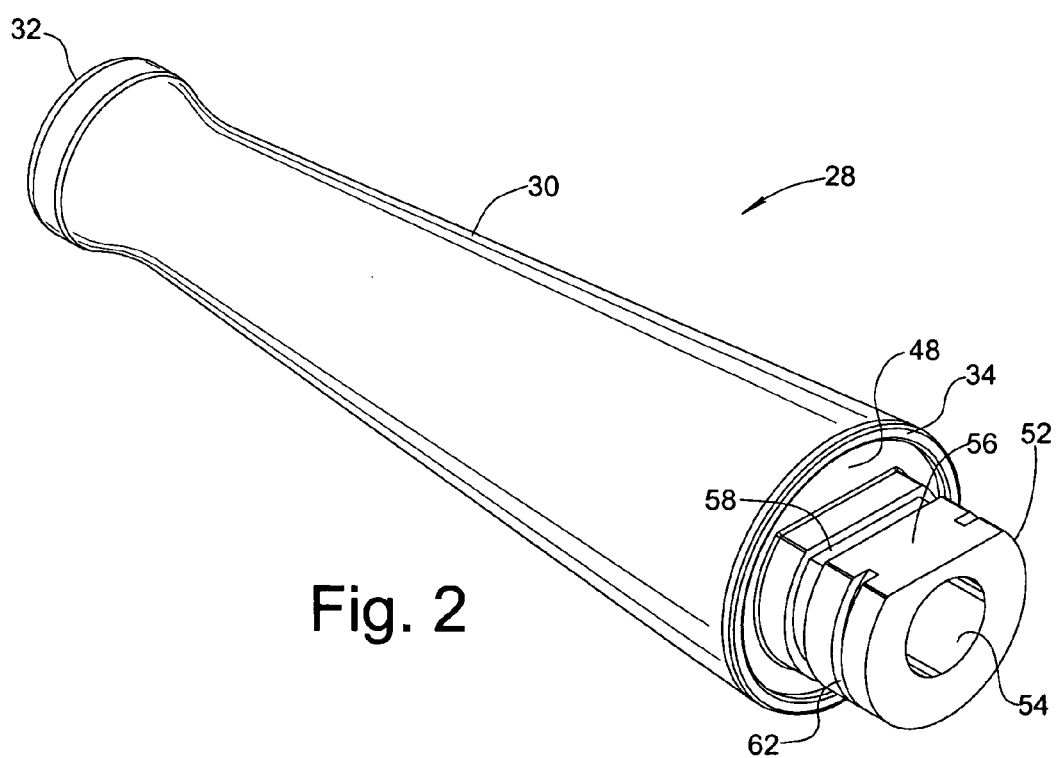
FIG. 2 is a perspective view of the strain relief device shown in FIG. 1, shown without a retainer clip and resilient ring.

Reference is made initially to FIG. 1, wherein an assembly formed in accordance with an embodiment of the present invention is depicted in exploded view and identified by reference numeral 8. Assembly 8 generally comprises an electronic device 10, a cable 22, and a strain relief device 28 for connecting cable 22 to electronic device 10. In the present specification, electronic device 10 is embodied, merely by way of example, as a hospital pillow speaker. It will be understood that electronic device 10 may be any electronic device.

Electronic device 10 includes a housing 12 for carrying a printed circuit board (not shown) of the electronic device. Housing 12 has a wall 14 and an opening 16 through the wall leading to an interior 20 of the housing.

Cable 22 may be arranged to pass through wall opening 16 to housing interior 20. Cable 22 is shown as including a plurality of conductors 24 terminating at a connection plug 26 for releasably coupling conductors 24 to a mounting header on the printed circuit board (not shown). Conductors 24 may include wires for conducting electrical power and signals, and/or optical transmission fibers for transmitting optical signals.

Strain relief device 28 is depicted in greater detail in FIGS. 2-5. Strain relief device 28 includes a semi-rigid sleeve 30 and a rigid insert 48 protruding from the sleeve and partially received by wall opening 16 of housing 12. The terms "semi-rigid" and "rigid" are used in a relative context in the present specification to indicate that a "rigid" element is more rigid, or has greater rigidity, than a "semi-rigid" element; these terms are not intended to mean any absolute rigidity values. By way of example, sleeve 30 may be formed of an elastic material such as rubber or a synthetic rubber (an elastomeric material). By way of further example, sleeve 30 may be formed of a thermoplastic elastomer (TPE), such as a thermoplastic vulcanizate (TPV), to provide both flexibility and durability. A commercially available TPV suitable as a material for manufacturing sleeve 30 is SANTOPRENE® TPV Grade 8211-55B100 available from Advanced Elastomer Systems, LP, an ExxonMobil Chemical affiliate. Insert 48 may be formed of an injection-molded plastic resin. A commercially available resin suitable as a material for manufacturing insert 48 is BAYBLEND® FR2010 resin available from Bayer Material Science LLC of Pittsburgh, Pa.

Strain relief device 28 also includes an axially extending passage therethrough which is defined by a sleeve passage 36 through sleeve 30 in cooperation with an insert passage 54 through insert 48 axially aligned with sleeve passage 36. As may be understood, cable 22 passes through the axially extending passage of strain relief device 28 to reach interior 20 of housing 12.

Sleeve 30 has a first end 32 and a second end 34 arranged closer to housing 12 than first end 32. Sleeve 30 has an outer surface 44 that may be tapered in a direction from second end 34 toward first end 32. Sleeve 30 includes a recess 46 adjacent second end 34 that is configured to receive a first portion 50 of insert 48 such that sleeve 30 surrounds first portion 50.

Sleeve passage 36 may have a first segment 38 characterized by an inner diameter D1 and a second segment 40 characterized by an inner diameter D2. A radial step 42 provides transition between first segment 38 and second segment 40. In accordance with an aspect of the present invention, diameter D1 and/or diameter D2 may be chosen such that sleeve 30 frictionally engages cable 22 when the cable is arranged to extend through sleeve passage 36. In an advantageous embodiment, diameter D1 is sized for interference fit with the cable by making D1 less than an outer diameter of cable 22, whereby elastic sleeve 30 grips or squeezes cable 22 along first segment 38. An interference fit of about 0.5 mm (0.020 inches) in diameter may provide a tight grip for transmitting forces from cable 22 to sleeve 30. First segment 38 of sleeve passage 36 may be located adjacent first end 32 of sleeve 30 where cable 22 enters sleeve 30. The diameter D2 of second segment 40 may be greater than diameter D1 of first segment 38, thereby making it easier to pull cable 22 through sleeve passage 36 during assembly or reassembly.

As described above, insert 48 includes a first portion 50 received by recess 46 at the second end 34 of sleeve 30 such that sleeve 30 surrounds first portion 50 of insert 48. The internal surface of recess 46 and external surface of insert 48 may have corresponding tapers and steps such that insert 48 is positioned both axially and radially with respect to sleeve 30 by proper surface-to-surface engagement between first portion 50 and recess 46. First portion 50 may be fixed to the internal surface of recess 46 by an adhesive. Insert passage 54 is axially aligned with sleeve passage 36, and has a diameter D3 that may be equal to diameter D2.

Insert 48 further includes a second portion 52 protruding from second end 34 of sleeve 30 and received by the wall opening 16 of housing 12. Wall opening 16 and second portion 52 may be shaped to prevent rotation of insert 48 relative to housing 12. Wall opening 16 and second portion 52 may be fitted to one another in a non-circular shape that prevents rotation of insert 44 relative to housing 12 about the longitudinal axis of strain relief device 28. In the embodiment depicted in the drawings, second portion 52 and wall opening 16 are D-shaped, wherein second portion 52 has a flat region 56 and wall opening 16 has a corresponding flat region 18. Consequently, rotation of strain relief device 28 relative to housing 12 about the longitudinal axis of the strain relief device is prevented. Those skilled in the art will recognize that other non-circular shapes may be used for second portion 52 and wall opening 16 to prevent rotation.

A retainer 64 is arranged to engage insert 48 and housing 12 to prevent withdrawal of the insert from wall opening 16 of the housing. Retainer 64 is selectively removable to permit withdrawal of the insert from the wall opening to facilitate servicing and repair operations. Retainer 64 may be a pin, clip, or other member arranged to engage both insert 48 and housing 12. In accordance with the embodiment shown, retainer 64 may be a C-shaped clip removably received by a first circumferential groove 62 about second portion 52 of insert 48, wherein retainer 64 is located near a leading end of second portion 52 so that the retainer will engage the inside of housing wall 14 when cable 22 and/or strain relief device 28 are pulled in a withdrawal direction relative to housing 12. As used herein, the term "circumferential" can mean a path partially around or completely around a part or element. The use of a C-shaped clip for retainer 64 in combination with a D-shaped second portion 52 is advantageous because the C-shaped clip traverses flat region 56 to define a gap 66 between the C-shaped clip and the flat region, whereby a tool may be inserted into gap 66 to pry the C-shaped clip off of second portion 52 to permit withdrawal of insert 48 from wall opening 16.

A resilient ring 60 may be arranged to provide a seal between the insert and the housing and keep the strain relief device 28 and housing 12 taut after assembly. Resilient ring 60 may be seated in a circumferential groove 58 about second portion 52 of insert 48, as may be seen in the depicted embodiment.

The invention provides an improved method for connecting a cable to a housing of an electronic device in situations where the housing includes a wall having an opening through which the cable can pass. In accordance with the method, a strain relief device 28 is provided that comprises a semi-rigid sleeve 30 of elastic material and a rigid insert 48 extending from the sleeve, the strain relief device 28 including an axially extending passage therethrough as may be defined by sleeve passage 36 and insert passage 54. The method further comprises pulling the cable 22 through the axially extending passage of the strain relief device 28, wherein at least a segment 38 of the axially extending passage is sized to squeeze the cable, and inserting a portion 52 of the insert 48 through the wall opening of the housing. The method also comprises the step of arranging a retainer, such as retainer 64, to engage the insert 48 and the housing to prevent withdrawal of the insert 48 from the wall opening of the housing. Retainer 64 may be selectively removable to permit withdrawal of insert 48 from the wall opening. As described above, the wall opening of the housing and second portion 52 received by the wall opening may be shaped to prevent rotation of insert 48 relative to the housing. Also, the method may further comprise the step of arranging a resilient ring, such as ring 60, between insert 48 and the housing. The method of the present invention is beneficial because it avoids the step of overmolding a strain relief device onto the cable.

Modifications and other embodiments of the invention set forth herein will be apparent to one skilled in the art to which the invention pertains in light of teachings presented in the present specification. Therefore, the invention is not to be limited to the specific embodiments disclosed, and modifications and other embodiments are intended to be included within the scope of the appended claims.

Parts List

8 Assembly including electronic device, cable, and strain relief device

10 Electronic device (pillow speaker)

12 Housing of electronic device
14 Housing wall
16 Opening through housing wall
18 Flat region of opening through housing wall
20 Interior of housing
22 Cable
24 Conductors
26 Connection plug
28 Strain relief device
30 Sleeve of strain relief device
32 First end of sleeve
34 Second end of sleeve
36 Sleeve passage
38 First segment of sleeve passage
40 Second segment of sleeve passage
42 Radial step in sleeve passage
44 Outer surface of sleeve
46 Recess at second end of sleeve
48 Insert
50 First portion of insert
52 Second portion of insert
54 Insert passage
56 Flat region of insert
58 Groove for resilient ring
60 Resilient ring
62 Groove for retainer
64 Retainer
66 Gap

What is claimed is:

1. A strain relief device for connecting a cable to a housing of an electronic device, the housing including a wall having an opening through which the cable can pass, the strain relief device comprising:
an elongated sleeve, the sleeve including first and second opposite ends and a sleeve passage extending in an axial direction through the sleeve; and
an insert, the insert including a first portion surrounded by the sleeve, a second portion protruding from the second end of the sleeve, and an insert passage extending in an axial direction through the insert, the insert passage being aligned with the sleeve passage;
wherein the insert is more rigid than the sleeve, and the second portion of the insert is shaped to be non-rotatably received by the wall opening of the housing;
wherein the sleeve passage has a first diameter sized such that the sleeve frictionally engages the cable when the cable is arranged to extend through the sleeve passage.

2. The strain relief device according to claim 1, wherein the first diameter is sized for interference fit with the cable.

3. The strain relief device according to claim 1, wherein the sleeve passage has the first diameter along a first segment of the sleeve passage.

4. The strain relief device according to claim 3, wherein the first segment of the sleeve passage is adjacent the first end of the sleeve.

5. The strain relief device according to claim 4, wherein the sleeve passage has a second diameter greater than the first diameter along a second segment of the sleeve passage.

6. The strain relief device according to claim 1, further comprising a resilient ring arranged circumferentially about the second portion of the insert.

7. The strain relief device according to claim 1, further comprising a retainer mounted on the insert and arranged to engage the housing to prevent withdrawal of the insert from the wall opening of the housing, the retainer being selectively removable from the insert to permit withdrawal of the insert from the wall opening.

8. The strain relief device according to claim 7, wherein the second portion of the insert includes a circumferential groove, and the retainer is a C-shaped clip removably received by the groove.

9. A strain relief device for connecting a cable to a housing of an electronic device, the housing including a wall having an opening through which the cable can pass, the strain relief device comprising:
an elongated sleeve, the sleeve including first and second opposite ends and a sleeve passage extending in an axial direction through the sleeve; and
an insert, the insert including a first portion surrounded by the sleeve, a second portion protruding from the second end of the sleeve, and an insert passage extending in an axial direction through the insert, the insert passage being aligned with the sleeve passage;
wherein the insert is more rigid than the sleeve, and the second portion of the insert is shaped to be non-rotatably received by the wall opening of the housing; and
a retainer mounted on the insert and arranged to engage the housing to prevent withdrawal of the insert from the wall opening of the housing, the retainer being selectively removable from the insert to permit withdrawal of the insert from the wall opening;
wherein the second portion of the insert includes a circumferential groove, and the retainer is a C-shaped clip removably received by the groove;
wherein the second portion of the insert is D-shaped to define a flat region, and the C-shaped clip traverses the flat region to define a gap between the C-shaped clip and the flat region.

10. A strain relief device for connecting a cable to a housing of an electronic device, the housing including a wall having an opening through which the cable can pass, the strain relief device comprising:
an elongated sleeve, the sleeve including first and second opposite ends and a sleeve passage extending in an axial direction through the sleeve; and
an insert, the insert including a first portion surrounded by the sleeve, a second portion protruding from the second end of the sleeve, and an insert passage extending in an axial direction through the insert, the insert passage being aligned with the sleeve passage;
wherein the insert is more rigid than the sleeve, and the second portion of the insert is shaped to be non-rotatably received by the wall opening of the housing;
wherein the sleeve is formed of a thermoplastic elastomer and the insert is formed of an injection-molded plastic resin.

11. An assembly comprising:
a cable having an outer diameter, the cable including conductors;
an electronic device to which the conductors connect, the electronic device including a housing wall having an opening;
a strain relief device including a semi-rigid sleeve and a rigid insert protruding from the sleeve and partially received by the wall opening of the housing, the strain relief device including an axially extending passage through which the cable passes to reach an interior of the housing;
wherein the wall opening of the housing and a portion of the insert received by the wall opening are shaped to prevent rotation of the insert relative to the housing; and
a retainer arranged to engage the insert and the housing to prevent withdrawal of the insert from the wall opening of the housing, the retainer being selectively removable to permit withdrawal of the insert from the wall opening;

wherein at least a segment of the axially extending passage has a diameter less than the outer diameter of the cable.

12. The assembly according to claim 11, wherein the portion of the insert received by the wall opening includes a circumferential groove, and the retainer is a C-shaped clip removably received by the groove.

13. An assembly comprising:
a cable having an outer diameter, the cable including conductors;
an electronic device to which the conductors connect, the electronic device including a housing wall having an opening;
a strain relief device including a semi-rigid sleeve and a rigid insert protruding from the sleeve and partially received by the wall opening of the housing, the strain relief device including an axially extending passage through which the cable passes to reach an interior of the housing;
wherein the wall opening of the housing and a portion of the insert received by the wall opening are shaped to prevent rotation of the insert relative to the housing;
a retainer arranged to engage the insert and the housing to prevent withdrawal of the insert from the wall opening of the housing, the retainer being selectively removable to permit withdrawal of the insert from the wall opening; and
a resilient ring arranged to provide a seal between the insert and the housing.

14. An assembly comprising:
a cable having an outer diameter, the cable including conductors;
an electronic device to which the conductors connect, the electronic device including a housing wall having an opening;
a strain relief device including a semi-rigid sleeve and a rigid insert protruding from the sleeve and partially received by the wall opening of the housing, the strain relief device including an axially extending passage through which the cable passes to reach an interior of the housing;
wherein the wall opening of the housing and a portion of the insert received by the wall opening are shaped to prevent rotation of the insert relative to the housing; and
a retainer arranged to engage the insert and the housing to prevent withdrawal of the insert from the wall opening of the housing, the retainer being selectively removable to permit withdrawal of the insert from the wall opening;
wherein the portion of the insert received by the wall opening includes a circumferential groove, and the retainer is a C-shaped clip removably received by the groove;
wherein the second portion of the insert and the wall opening of the housing are D-shaped to define a flat region, and the C-shaped clip traverses the flat region of the insert to define a gap between the C-shaped clip and the flat region of the insert.

15. A method for connecting a cable to a housing of an electronic device, the housing including a wall having an opening through which the cable can pass, the method comprising the steps of:
providing a strain relief device comprising a sleeve of elastic material and a rigid insert extending from the sleeve, the strain relief device including an axially extending passage therethrough;
pulling the cable through the axially extending passage of the strain relief device, wherein at least a segment of the axially extending passage squeezes the cable;
inserting a portion of the insert through the wall opening of the housing wherein the wall opening of the housing and the portion of the insert received by the wall opening are shaped to prevent rotation of the insert relative to the housing; and
arranging a retainer to engage the insert and the housing to prevent withdrawal of the insert from the wall opening of the housing.

16. The method according to claim 15, wherein the retainer is selectively removable to permit withdrawal of the insert from the wall opening.

17. The method according to claim 15, wherein the wall opening of the housing and a portion of the insert received by the wall opening are shaped to prevent rotation of the insert relative to the housing.

18. The method according to claim 15, further comprising the step of arranging a resilient ring between the insert and the housing.

* * * * *